United States Patent
Doehla et al.

(10) Patent No.: US 8,849,778 B2
(45) Date of Patent: Sep. 30, 2014

(54) APPARATUS AND METHOD FOR STORING AND READING A FILE HAVING A MEDIA DATA CONTAINER AND A METADATA CONTAINER

(75) Inventors: Stefan Doehla, Erlangen (DE); Harald Fuchs, Roettenbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 118 days.

(21) Appl. No.: 12/678,572

(22) PCT Filed: Sep. 18, 2008

(86) PCT No.: PCT/EP2008/007832
§ 371 (c)(1),
(2), (4) Date: Mar. 17, 2010

(87) PCT Pub. No.: WO2009/036980
PCT Pub. Date: Mar. 26, 2009

(65) Prior Publication Data
US 2010/0198798 A1    Aug. 5, 2010

Related U.S. Application Data

(60) Provisional application No. 60/973,536, filed on Sep. 19, 2007.

(51) Int. Cl.
*G09F 7/00* (2006.01)
*H04L 1/00* (2006.01)
*H04N 17/00* (2006.01)
*G11B 20/10* (2006.01)
*H04L 1/18* (2006.01)

(52) U.S. Cl.
CPC .... *H04L 1/0082* (2013.01); *G11B 2020/10537* (2013.01); *H04L 1/18* (2013.01); *H04L 1/0045* (2013.01); *H04N 17/00* (2013.01)
USPC ................ 707/696; 707/673; 327/551

(58) Field of Classification Search
CPC ............... G06F 17/30286–17/30336
See application file for complete search history.

(56) References Cited

U.S. PATENT DOCUMENTS

| 6,075,920 A | 6/2000 | Kawamura et al. |
| 7,567,584 B2 | 7/2009 | Toma et al. |

(Continued)

FOREIGN PATENT DOCUMENTS

| CN | 1650628 A | 8/2005 |
| CN | 101087438 A | 12/2007 |

(Continued)

OTHER PUBLICATIONS

Official Communication issued in International Patent Application No. PCT/EP2008/007832, mailed on Apr. 3, 2009.

(Continued)

*Primary Examiner* — Tony Mahmoudi
*Assistant Examiner* — Tuan-Khanh Phan
(74) *Attorney, Agent, or Firm* — Keating & Bennett, LLP (57) ABSTRACT

A concept is disclosed for outputting a file having a media data container and a metadata container, the concept including providing an error information related to a data sample and storing the error information together with a sample number related to the data sample in the metadata container.

23 Claims, 5 Drawing Sheets

(56) References Cited

U.S. PATENT DOCUMENTS

| | | |
|---|---|---|
| 7,885,366 B2 | 2/2011 | Fuchikami et al. |
| 2003/0138100 A1 | 7/2003 | Ishizaka et al. |
| 2004/0006575 A1 | 1/2004 | Visharam et al. |
| 2004/0010595 A1 | 1/2004 | Hiranaka |
| 2004/0039684 A1 | 2/2004 | Sandor |
| 2004/0167925 A1 | 8/2004 | Visharam et al. |
| 2004/0199565 A1 | 10/2004 | Visharam et al. |
| 2005/0123136 A1 | 6/2005 | Shin et al. |
| 2006/0129909 A1 | 6/2006 | Butt et al. |
| 2007/0011321 A1* | 1/2007 | Huntington et al. .......... 709/224 |
| 2007/0280129 A1 | 12/2007 | Jia et al. |

FOREIGN PATENT DOCUMENTS

| | | |
|---|---|---|
| EP | 1 744 565 A2 | 1/2007 |
| EP | 1 898 414 A1 | 3/2008 |
| JP | 2003-087734 A | 3/2003 |
| JP | 2004-38575 A | 2/2004 |
| JP | 2005-039577 A | 2/2005 |
| JP | 2005-229587 A | 8/2005 |
| JP | 2005-348015 A | 12/2005 |
| JP | 2006-505027 A | 2/2006 |
| WO | 01/55877 A1 | 8/2001 |
| WO | 2005/002231 A1 | 1/2005 |
| WO | 2006/112508 A1 | 10/2006 |

OTHER PUBLICATIONS

Official Communication issued in corresponding International Application PCT/EP2008/007832, Completed on Dec. 15, 2009.
Official Communication issued in corresponding Japanese Patent Application No. 2010-525253, mailed on Mar. 4, 2014.
Official Communication issued in corresponding Japanese Patent Application No. 2010-525253, mailed on Apr. 2, 2013.
English translation of Official Communication issued in corresponding Chinese Patent Application No. 200880108409.8, mailed on May 3, 2012.
Official Communication issued in corresponding Japanese Patent Application No. 2010-525253, mailed on Jun. 26, 2012.

* cited by examiner

APPARATUS AND METHOD FOR STORING AND READING A FILE HAVING A MEDIA DATA CONTAINER AND A METADATA CONTAINER

BACKGROUND OF THE INVENTION

The invention relates to media storage, transmission, reception and playback, in particular to media storage in or playback from a file having a media data container and a metadata container, as e.g. a file based on the ISO (International Organization for Standardization) base media file format.

Various electronic devices are enabled to receive and present media data streams. Such media data streams can e.g. be received from a digital video broadcasting network that broadcasts media streams in accordance with e.g. the DVB-H Standard (Digital Video Broadcasting—Handhelds) or the DVB-T Standard (Digital Video Broadcasting—Terrestrial).

DVB-T uses a self-contained MPEG-2 (MPEG=Moving Pictures Expert Group) transport stream containing elementary MPEG-2 video and audio streams according to the international standard ISO/IEC 13818 (IEC=International Electrotechnical Commission). The MPEG-2 transport stream is a multiplex used in many of today's broadcast systems. It is a stream multiplex of one or more media programs, each containing typically audio and video but also other data. MPEG-2 transport streams share a common clock per program and use time-stamped media samples (Access Units, AUs) in all media streams within a program. This enables synchronization of sender and receiver clocks and lip synchronization of audio and video streams.

For DVB-H, elementary audio and video streams are encapsulated in RTP (Real-Time Transport Protocol), UDP (User Datagram Protocol), IP (Internet Protocol), and MPE (Multi-Protocol Encapsulation) for IP data casting. RTP is used for effective real-time delivery of multi-media data over IP networks. Multiplexing is typically done by associating different network ports to each distinct media stream, e.g. one network port for video and another one for audio.

A streaming service is defined as a set of synchronized media streams delivered in a time-constraint or unconstraint manner for immediate consumption during reception. Each streaming session may comprise audio, video and/or real-time media data like timed text. A user receiving media data for a movie by means of a mobile television, for instance, can watch the movie and/or record it to a file. Commonly, for this purpose the received data packets of the received media stream are de-packetized in order to store raw media data to the file. That is, received RTP packets or MPEG-2 packets are first de-packetized to obtain their payload in form of media data samples, such as compressed video or audio frames. Then, after de-packetizing, obtained media data samples are replayed or stored to the file. The obtained media samples are commonly compressed by formats like the H.264/AVC (AVC=Advanced Video Coding) video format and/or the MPEG-4 HE-AACv2 (HE-AACv2=High-Efficiency Advanced Audio Coding version 2) audio format. When media data samples having such video and/or audio formats are to be stored, they may be stored in a so-called 3GP file format, also known as 3GPP (3rd Generation Partnership Project) file format, or in an MP4 (MPEG-4) file format. Both 3GP and MP4 are derived from the ISO base media file format, which is specified in the ISO/IEC international standard 14496-12:2005 "Information technology-coding of audio-visual objects—part 12: ISO base media file format". A file of this format comprises media data and metadata. For such a file to be operable, both of these data may be present. The media data is stored in a media data container (mdat) related to the file and the metadata is stored in a metadata container (moov) of the file. Conventionally, the media data container comprises actual media samples. I.e., it may comprise e.g. interleaved, time-ordered video and/or audio frames. Thereby, each media has its own metadata track (trak) in the metadata container moov that describes the media content properties. Additional containers (also called boxes) in the metadata container moov may comprise information about file properties, file content, etc.

Recently, so-called reception hint tracks for files based on the ISO base media file format have been defined by international standardization groups. Those reception hint tracks may be used to store multiplexed and/or packetized streams like e.g. a received MPEG-2 transport stream or RTP packets. Reception hint tracks may be used for a client side storage and playback of received data packets. Which shall also be denoted as data samples in the sequel of this specification. Thereby, received MPEG-2 TS or RTP packets of one stream are directly stored in reception hint tracks as e.g. pre-computed samples or constructors. I.e., in the case of reception hint tracks, the data packets are stored as samples in the media data container of the file based on the ISO base media file format. Playback from reception hint tracks may be done by emulating the normal stream reception and reading the stored data packets from the reception hint track as they were received over IP.

The ISO/IEC international standard 14496-12:2005 "Information technology-coding of audio-visual objects—part 12: ISO base media file format" defines a sample grouping as an assignment of each sample in a track to be a member of one sample group, based on a grouping criterion. As there may be more than one sample grouping for the samples in track, each sample grouping has a type field to indicate the type of grouping.

Sample groups are defined in two steps. First, a type of the grouping is defined in a sample group description box (sgpd). In a second step, this description is assigned to samples in a sample-to-group box (sbgp). The sample groups mechanism is extensible and is currently used for AVC- and SVC-specific extensions and proprietary extensions.

A non-exhaustive description of the syntax is given below:

```
abstract class SampleGroupDescriptionEntry {
    // proprietary data
}
```

A simplified version of the SampleGroupDescriptionBox is given here. In the ISO file format specialized versions depending on the handler type exist.

```
aligned(8) class SampleGroupDescriptionBox extends
FullBox(„sgpd") {
    unsigned int(32) grouping_type;
    unsigned int(32) entry_count;
    for(i=1; i<=entry_count; i++) {
        SampleGroupDescriptionEntry( );
    }
}
```

In one instance of the box multiple groups can be defined and every sample may be member of one group. The syntax of the SampleToGroup box is provided.

```
aligned(8) class Sample-to-group box extends FullBox(„sbgp")
{
    unsigned int(32) grouping_type;
    unsigned int(32) entry_count;
    for(i=1; i<=entry_count; i++) {
        unsigned int(32) sample_count;
        unsigned int(32) group_desc_index;
    }
}
```

The following abstract example shall illustrate how sample groups work:

Let us assume that the "color" of each sample has to be described. For a complete set of samples all samples with the same color are grouped together.

First, it has to be specified which colors can occur. For each color, a "SampleGroupDescriptionEntry" is defined. A value for the grouping_type "color" is defined and all color description entries are stored in the SampleGroupDescriptionBox for the grouping_type color.

Second, the sample-to-group box for the "color" grouping_type describes which sample has which color. This is done in differential way: every list entry describes how many consecutive samples have the same color. This allows a very compact storage for a rare change of colors, e.g. first a high number of samples have color one, then a number of samples have color 2 and so on.

For three colors and a file of 50 samples the tables based on the above described syntax could look like this:

```
SampleGroupDescriptionBox („sgpd") {
    grouping_type = "colr";
    entry_count = 3; // = number of sample group
    description entries
    // list of three sample group description entries:
    "Black"
    "White"
    "Red"
}
Sample-to-group box („sbgp") {
    grouping_type = "colr";
    entry_count = 5; // = number of entries of the
    following list
    // list for all 50 samples:
    (3,1) // = the first 3 samples of the file are black
    (10, 3) // = the next 10 samples of the file are red
    (8,2) // = the next 8 samples of the file are white
    (20, 3) // = the next 20 samples of the file are white
    (9,1) // = the last 9 samples of the file are black
}
```

As described above, sample groups are well suited to classify samples into different categories, but they are not well suited when events related to or properties of individual samples need to be described in the file. The main reason for that is that sample groups describe a complete set of samples, and samples that do not belong to a group entry may be member of a "does not belong to any group"-group entry. Another reason is a slow look-up of the sample group a sample belongs to.

An event or property shall be understood as an index for a single sample or a relatively small number of samples. The event or property occurs on an indexed sample, but may influence an arbitrary number of following samples, e.g. random-access-points can be treated as events.

An example for events compared to the above example is "color-change". If not the color itself, but the change from on color to another has to be indexed, sample groups are not very well suited, because the "sample group" based index has to include also the unwanted information "no color change". Especially in the case of frequent changes, this may lead to an inefficient index table. Parsing for the events near the end of file tends to be a complex operation, because all sample counts (also that of the "non-event" group samples) have to be summed up.

For trick-play modes (e.g. fast-forward, seeking into the file, etc.) the closest random-access-point to the desired entry point needs to be identified efficiently. Therefore a table of samples this event applies to may be examined for the right entry-point. Random-access-points can exist at multiple levels, so, e.g., first the video decoder configuration is needed in the file and then the closest I-frame of the video track and above of that the multiplex-level entry-point (e.g. the PAT in case of MPEG-2 TS).

An additional problem is that sample groups do not allow the association of a sample to multiple group descriptions. This complicates stacking of events and will not give a compact representation, if sample groups are used for solving this indexing issue.

SUMMARY

According to an embodiment, an apparatus for outputting a file based on the ISO base media file format having a media data container and a metadata container may have: an error information provider adapted to analyze a sequence of data samples in order to provide an error information related to a missing or corrupted data sample in the sequence of data samples; a recorder for storing the error information together with a sample number related to the missing or corrupted data sample in the metadata container of the file based on the ISO base media file format.

According to another embodiment, a method for outputting a file based on the ISO base media file format having a media data container and a metadata container may have the steps of: analyzing a sequence of data samples in order to provide an error information related to a missing or corrupted data sample in the sequence of data samples; storing the error information together with a sample number related to the missing or corrupted data sample in the metadata container of the file based on the ISO base media file format.

According to another embodiment, a computer program may carry out, when the computer program is run on a computer or micro controller, a method for outputting a file based on the ISO base media file format having a media data container and a metadata container, wherein the method may have the steps of: analyzing a sequence of data samples in order to provide an error information related to a missing or corrupted data sample in the sequence of data samples; storing the error information together with a sample number related to the missing or corrupted data sample in the metadata container of the file based on the ISO base media file format.

According to another embodiment, an apparatus for reading a file based on the ISO base media file format with a media data container having stored data samples, and with a metadata container having stored error information related to the stored data samples may have: a parser for parsing the metadata container in order to find error information related to a data sample to be processed; and a processor for providing an error-specific measure in case the related error information indicates that the data sample to be processed is not available or corrupted.

According to another embodiment, a method for reading a file with a media data container based on the ISO base media file format having stored data samples, and with a metadata container having stored error information related to the stored data samples may have the steps of: parsing the metadata container in order to find error information related to a data sample to be processed; and providing an error-specific measure in case the related error information indicates that the data sample to be processed is missing or corrupted.

According to another embodiment, a computer program may carry out, when the computer program is run on a computer or micro controller, a method for reading a file with a media data container based on the ISO base media file format having stored data samples, and with a metadata container having stored error information related to the stored data samples, wherein the method may have the steps of: parsing the metadata container in order to find error information related to a data sample to be processed; and providing an error-specific measure in case the related error information indicates that the data sample to be processed is missing or corrupted.

For the solution of above-mentioned object, embodiments of the present invention also provide computer-programs for carrying out the inventive methods.

The present invention is based on the finding that an event or a property related to a specific sample or to a certain number of subsequent samples can be provided by storing property information together with the related sample number in the metadata container of a file based on the ISO base media file format. In a specific embodiment the property information relates to errors of or related to a certain sample or a sequence of samples. For the purpose of storing error-related metadata, dedicated containers or boxes are provided in the metadata container ("moov") of the file. Thereby, error information to be stored is defined in two steps. First, a type of error is defined in a sample-property-description box ("spdb"). In a second step, the error type description is assigned to specific samples in a sample-to-property box ("stpb").

According to an embodiment of the present invention the property- or error-related metadata boxes spdb, stpb are comprised by a sample-table box ("stbl") comprising time and data indexing of the samples in a track. Using the tables comprised by the sample-table box stbl, it is possible to locate samples in time, determine their type, their size, container (in the media data portion of the file) and offset into that container.

With embodiments of the present invention it is possible to efficiently determine erroneous samples or samples in the neighborhood of erroneous samples. For example, an erroneous sample might be a corrupted sample or a missing sample that was either not stored in the media data container or lost during a previous transmission of data samples from a transmitter to a receiver before saving it to the file.

According to an embodiment of the present invention the samples are data packets, such as RTP or MPEG-2 transport stream data packets, received during a streaming session or already stored in the media data container of the file based on the ISO base media file format as in the case of reception hint tracks.

According to an embodiment of the present invention the error information stored in the metadata container (moon) comprises a qualitative error information, such as an error type, and the associated sample number of the erroneous data sample. Additionally, the error information may further comprise quantitative error information, such as e.g. a detailed description of an error.

In order to generate the file, embodiments of the present invention provide an apparatus for outputting the file having a media data container and a metadata container, the apparatus comprising an error information provider for providing an error information related to a data sample, and a recorder for storing the error information together with a sample number related to the data sample in the metadata container.

Further, embodiments of the present invention provide an apparatus for reading a file with a media data container having stored data samples, and with the metadata container having stored error information related to the stored data samples, the apparatus comprising a parser for parsing the metadata container in order to find error information related to a data sample to be processed, and a processor for providing an error-specific measure or action in case the related error information indicates that the data sample to be processed is erroneous.

For example, the error-specific measure may be an error concealment or an error indication measure. Error concealment may be performed in order to hide an erroneous data sample or data packets from a user e.g. during playback of the stored data samples or packets. For example, when replaying audio, a lost or corrupted audio frame may be replaced by specific concealment methods known in the art. The same holds for lost or corrupted video frames.

Further, the stored error information may be used to unambiguously identify all erroneously received data samples after the complete transmission of data samples is received and stored to a file. Embodiments of the present invention provide an apparatus for reading and parsing the metadata container in order to identify erroneous data samples stored in the media data container and request and receive new copies of these erroneous data samples from a data server, e.g. a streaming server, in a non-realtime operation. The erroneous data samples are replaced in the file with the newly received error-free data samples to convert the stored file containing errors to an error-free file.

Embodiments of the present invention offer a compact representation of errors. Sample numbers may be used for a fast table look-up. This may be especially useful for long files, like e.g. recordings of complete movies. By directly relating error information to sample numbers a depacketizer or decoder may be "warned" or informed before trying to process an erroneous data packet or data sample, such that appropriate countermeasures can be envisaged.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

The following description sets forth specific details, such as particular embodiments, procedures, techniques, etc. for purposes of explanation and not limitation. But it will be appreciated by one skilled in the art that other embodiments may be employed apart from these specific details. For example, although the following description is facilitated using non-limiting example applications to different embodiments, the technology may be employed to any type of systems. In some instances, detailed descriptions of well known methods, interfaces, circuits, and device are omitted so as not to obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1A:
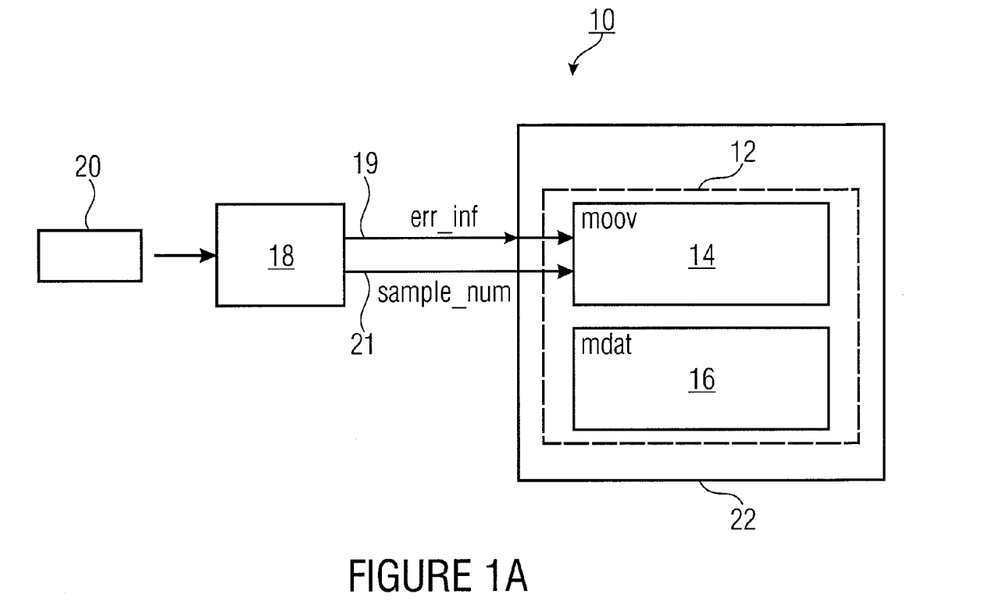
FIG. 1a is a schematic block diagram of an apparatus for outputting a file having a media data container and a metadata container according to an embodiment of the present invention.

FIG. 1a shows an exemplary block diagram of an apparatus 10 for outputting a file 12 having a media data container 14 and a metadata container 16.

The apparatus 10 comprises an error information provider 18 for providing an error information 19 related to a data sample 20 input to the error information provider 18. Further, the apparatus 10 comprises a recorder 22 for storing the error information 19 together with a sample number 21 related to the data sample 20 in the metadata container 14 of the file 12.

According to an embodiment of the present invention the error information provider 18 is adapted to analyze a sequence of data samples 20 in order to provide an error information 19 related to missing data samples in the analyzed sequence of data samples. This may be useful for identifying samples that were, for example, lost during a streaming session. In case a missing data sample is detected, the recorder 22 may store error information 19 indicating the missing data sample together with a sample number 21 of an existing data sample next to or in the neighborhood of the missing data sample or packet. In other words, since the recorder 22 cannot store a sample number of a not existing because lost data sample, it may associate the error information related to the lost sample to a neighboring data sample that was not lost. Illustrative examples will be given further below.

Additionally or alternatively, the error information provider 18 may be adapted to detect whether at least a part of the data sample 20 contains corrupted information. For example, due to certain effects, e.g. like channel fading or additive noise, during the transmission from data samples from a sender to a receiver, information carried by the data samples may be tampered or corrupted, such that a received version of a data sample does not correspond to a transmitted version of the data sample anymore. In this case, error correction or error concealment methods may e.g. be applied at the receiving end.

Figure 1B:
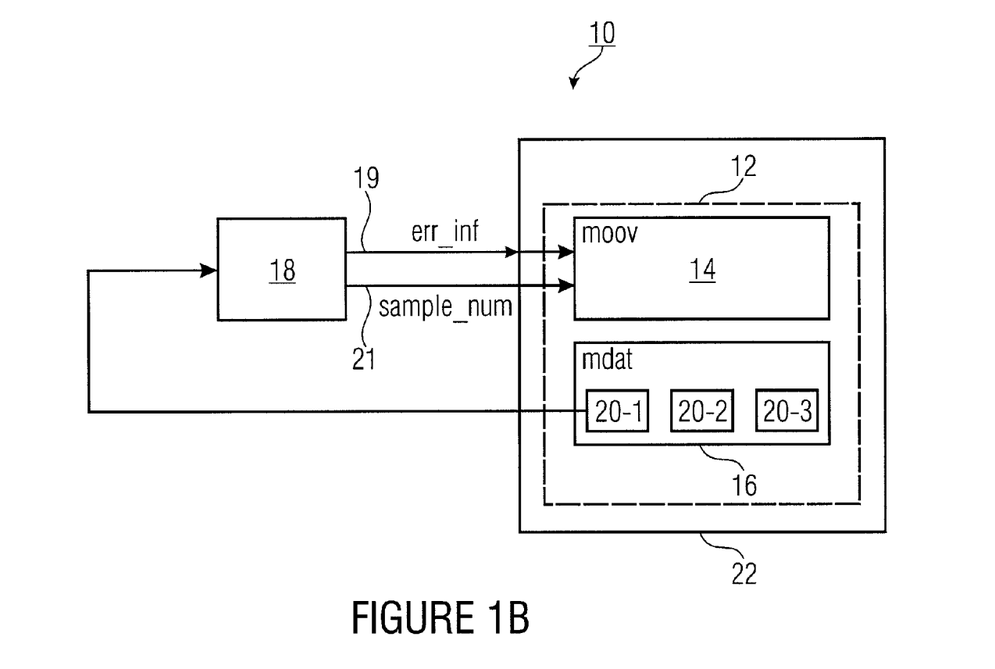
FIG. 1b is a schematic block diagram of an apparatus for outputting a file having a media data container and a metadata container according to a further embodiment of the present invention.

FIG. 1b shows an apparatus 10 according to a further embodiment of the present invention.

In the embodiment shown in FIG. 1b data samples 20-1, 20-2, 20-3 are already stored in the media data container 16 (mdat) of the file 12 based on the ISO base media file format. Typically, samples 20-1, 20-2, 20-3 within the media data box 16 are grouped into so-called chunks. Chunks can be of different sizes, and the samples within a chunk can have different sizes. In the case of FIG. 1b the error information provider 18 is adapted to parse or analyze the stored data samples 20-1, 20-2, 20-3 in the media data container 16 in order to detect missing, corrupted or generally erroneous data samples. In case the data samples 20-1, 20-2, 20-3 are data packets, such as e.g. RTP or MPEG-2 transport stream data packets, the data packets usually comprise sequence numbers indicating an order of transmission. The error information provider 18 may check the sequence numbers of the stored data samples 20-1, 20-2, 20-3 and thus detect missing sequence numbers. Additionally, the stored sequence or chunks of data samples 20-1, 20-2, 20-3 may be parsed in order to find corrupted samples.

Figure 1C:
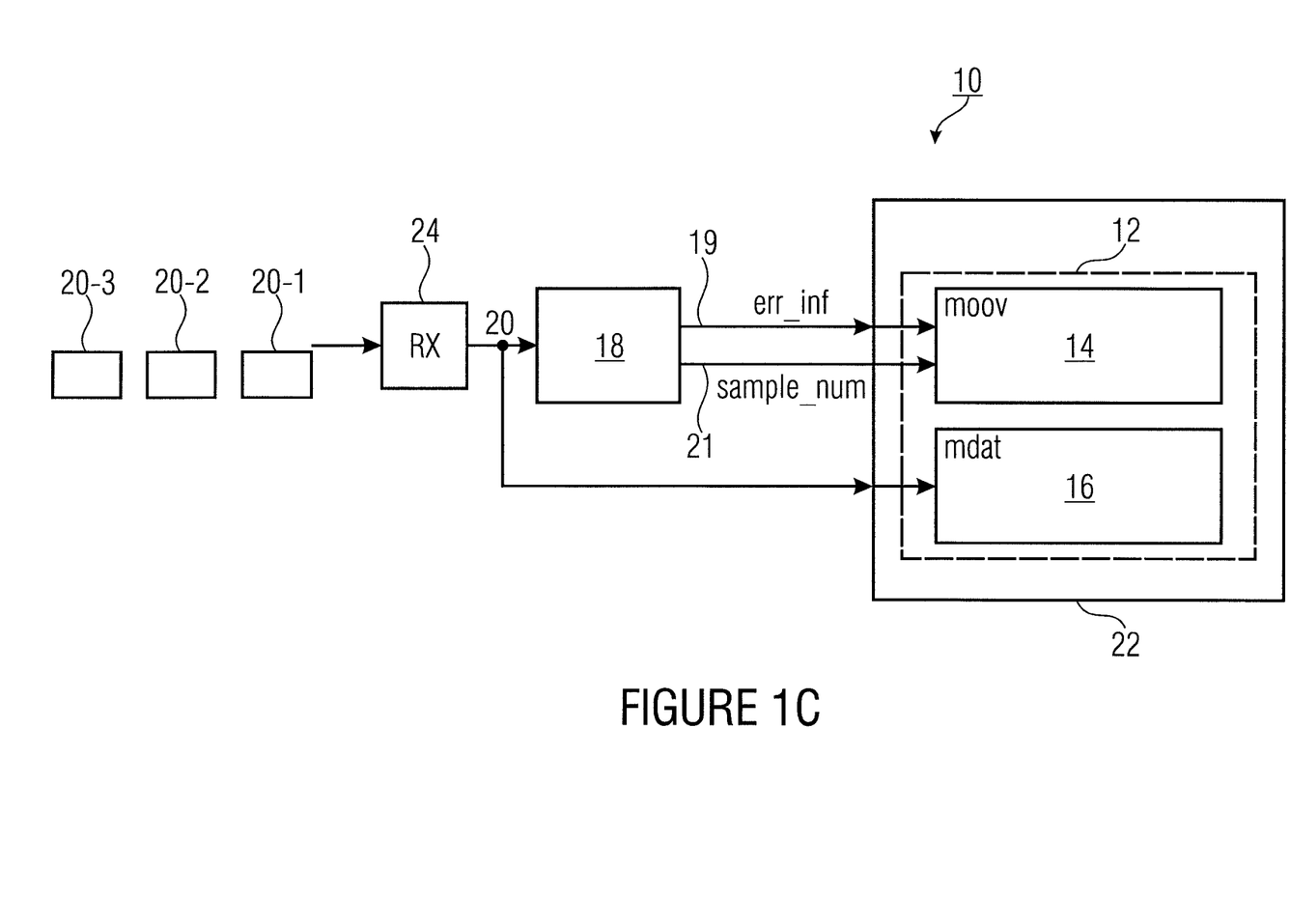
FIG. 1c is a schematic block diagram of an apparatus for outputting a file having a media data container and a metadata container according to yet a further embodiment of the present invention.

A further embodiment of the apparatus 10 is shown in principle in FIG. 1c.

This embodiment comprises a receiver 24 for receiving streamed data samples 20-1, 20-2, 20-3, which may be raw media data samples or data packets comprising packetized media data samples. The output of the receiver 24 is coupled to the input of the error information provider 18, such that it may check the received data samples 20-1, 20-2, 20-3 in order to detect a missing or corrupted data sample and to provide according qualitative and, optionally, quantitative error information. In the example given in FIG. 1c the recorder 22 is adapted to store the received data samples 20 in chunks of the media data container 16 of the file 12 and to associate a sample number 21 to each of the stored data samples.

According to embodiments of the present invention the provided error information 19 is stored in a sub-box of a sample table box (stbl) comprised by the metadata container 14 (moon), the sample table box (stbl) allowing an indexing from timing of the data samples 20-1, 20-2, 20-3 to their associated sample numbers 21-1, 21-2, 21-3 in the chunks. This shall be illustrated in further detail referring to FIG. 2.

Figure 2:
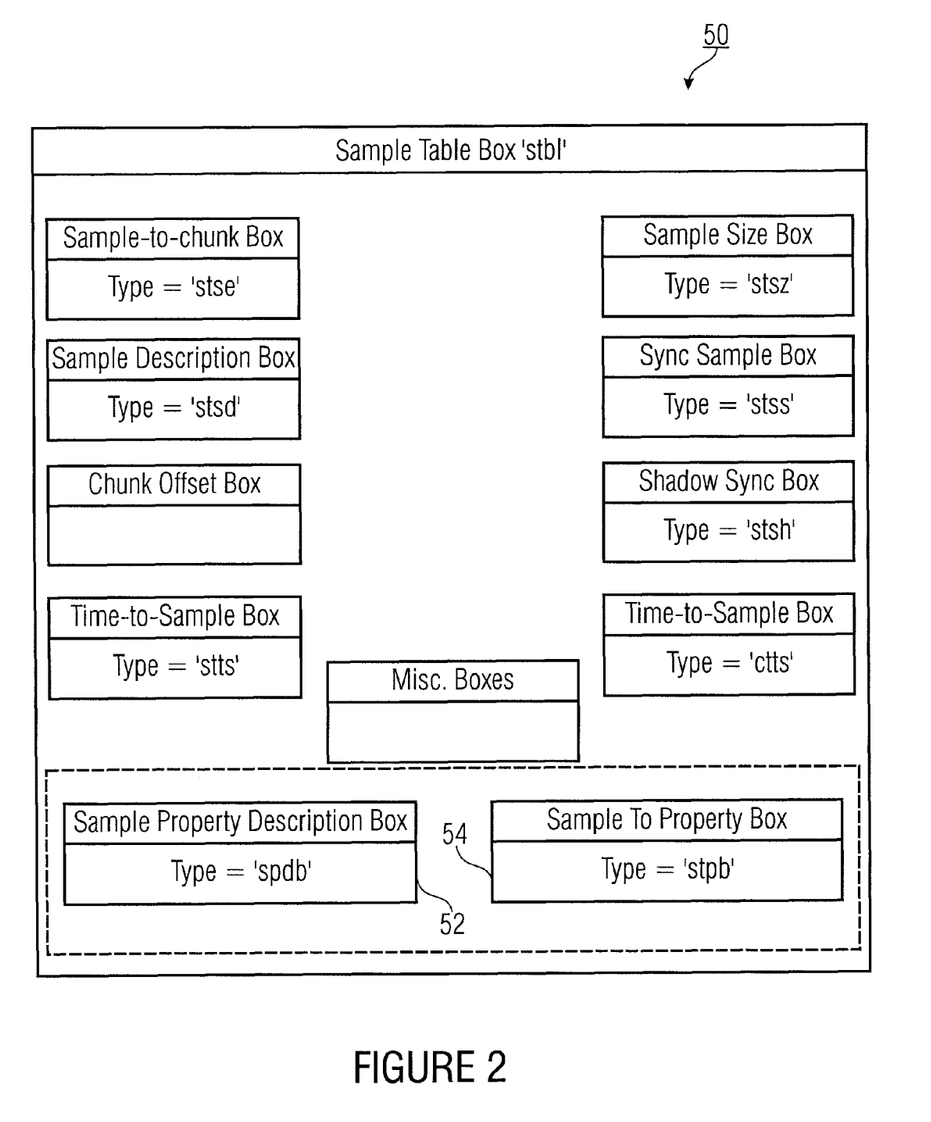
FIG. 2 is a schematic structure of a sample table box according to an embodiment of the present invention.

FIG. 2 shows a sample table box stbl 50 of a file based on the ISO base media file format comprising—besides conventional media data referencing sub-boxes, such as e.g. a sample description box (stsd), a sample size box (stsz), a sample to chunk box (stsc) and a chunk offset box (stco)—inventive sub-boxes 52 and 54. The sample description box (stsd) is needed because it contains a data reference index field which indicates, which data reference box is used to retrieve the samples in the media data container (mdat). Without the sample description it would not be possible to determine where the samples are stored. A synch sample table (stss) is optional. If the synch sample table (stss) is not present, all samples are synch samples. In addition to the conventional sub-boxes known to a person skilled in the art, the sample table box stbl 50 comprises two additional sub-boxes 52 and 54 related to the error information 19 provided by the error information provider 18. In the following, sub-box shall be exemplarily denoted as SamplePropertyDescriptionBox spdb, wherein sub-box 54 shall be exemplarily denoted as SampleToPropertyBox stpb. According to embodiments of the present invention, a property of a sample is the fact that the sample relates to an error or that the sample itself is erroneous.

The SampleToPropertyBox stpb 54 maps samples to their properties, i.e. errors according to embodiments. Properties may be stacked, i.e. multiple properties of the same property type (error) may apply to one sample. A length of a value of a specific property (property_length) is unspecified and depends on the property. A file reader that does not understand a property-type may discard the entire box stpb 54.

The SamplePropertyDescriptionBox spdb 52 describes the properties of one property_type. A sample property description entry is not specifically defined and may be proprietary. A reading apparatus may parse the box spdb 52 only if it understands property_type or will discard both the SampleToPropertyBox stpb 54 and the SamplePropertyDescriptionBox spdb 52 of this property_type. An exemplary syntax for sample properties may look like this:

```
aligned(8) class SampleToPropertyBox extends FullBox("stpb") {
    unsigned int(32) property_type;
    unsigned int(32) entry_count;
    for(i=1; i<=entry_count; i++) {
        unsigned int(32) property_desc_index;
        unsigned int(32) sample_count;
        for(j=1; j<=sample_count; j++) {
            unsigned int(32) sample_number;
            unsigned int(property_length) value;
        }
    }
}
aligned(8) class SamplePropertyDescriptionBox extends
FullBox("spdb") {
    unsigned int(32) property_type;
    unsigned int(32) entry_count;
    for(i=1; i<=entry_count; i++) {
        SamplePropertyDescriptionEntry( );
    }
}
```

According to embodiments errors may be indexed, i.e. transmission errors may be marked in a reception hint track. For this reason two different error classes may be defined:
a) lost packets
b) corrupted packets Hence, according to the exemplary nomenclature above, a SamplePropertyDescriptionEntry may be defined for each of these according to

```
class SamplePropertyDescriptionBox {
    unsigned int(32) property_type = 'errr';
    unsigned int(32) entry_count = 2;
    { // entry_count = 2 => 2 entries
        LostPacketEntry( );
        CorruptedPacketEntry( ) ;
    }
}.
```

The SamplePropertyDescriptionEntries may be defined as:

```
class LostPacketEntry extends SamplePropertyDescriptionEntry {
    unsigned int(32) size = 36; // 4+4+2+26
    unsigned int(32) desc_type = 'lost';
    unsigned int(16) property_length = 32; // value contains number of consecutively lost packets before
    unsigned int(8) verbose_description = "lost transmission packets"; }
class CorruptedPacketEntry extends
SamplePropertyDescriptionEntry {
    unsigned int(32) size = 41; // 4+4+2+31
    unsigned int(32) desc_type = 'crpt';
    unsigned int(16) property_length = 0;
    unsigned int(8) verbose_description = "corrupted transmission packets"; }
```

Here, LostPacketEntry corresponds to first qualitative error information and is used to initialize the run of the first property_desc_index in the SampleToPropertyBox stpb 54. CorruptedPacketEntry corresponds to second qualitative error information and initializes the run with the second property_desc_index.

If we have for example a transmission with packets [1, n], with n=1000, which was affected by transmission errors, say packets 310 to 367 were lost and packets 34 and 177 were corrupted, the entries of the SampleToPropertyBox may be:

```
class SampleToPropertyBox {
    unsigned int(32) property_type = 'errr';
    unsigned int(32) entry_count = '2';
    { // entry_count = 2 => 2 entries
        {
            property_desc_index = 1; // => lost packets
            sample_count = 1; // only one sample contains
                                 information on lost packets
            {
                {310, 58}
            }
        }
        {
            property_desc_index = 2; // => corrupted packets
            sample_count = 2; // two samples were corrupted
            {
                {34, ""}
                {177, ""}
            }
        }
    }
}
```

If each received packet yields a sample and packets 310 to 367 were lost, then samples 1 to 309 contain packets 1 to 309. Samples 310 to 942 contain packets 378 to 1000.

In the example above, for property_desc_index with value 1, the next received packet after the loss contains the error indication or information. The value of the SampleProperty, i.e. the quantitative error information, is the number of consecutively lost packets before, hence 58.

Corrupted packets were marked as such with the run for property_desc_index=2. Hence, sample 34 and 177 were marked as corrupted. Since the value of property length is zero for this property_desc_index, no value is assigned to it.

Figure 3:
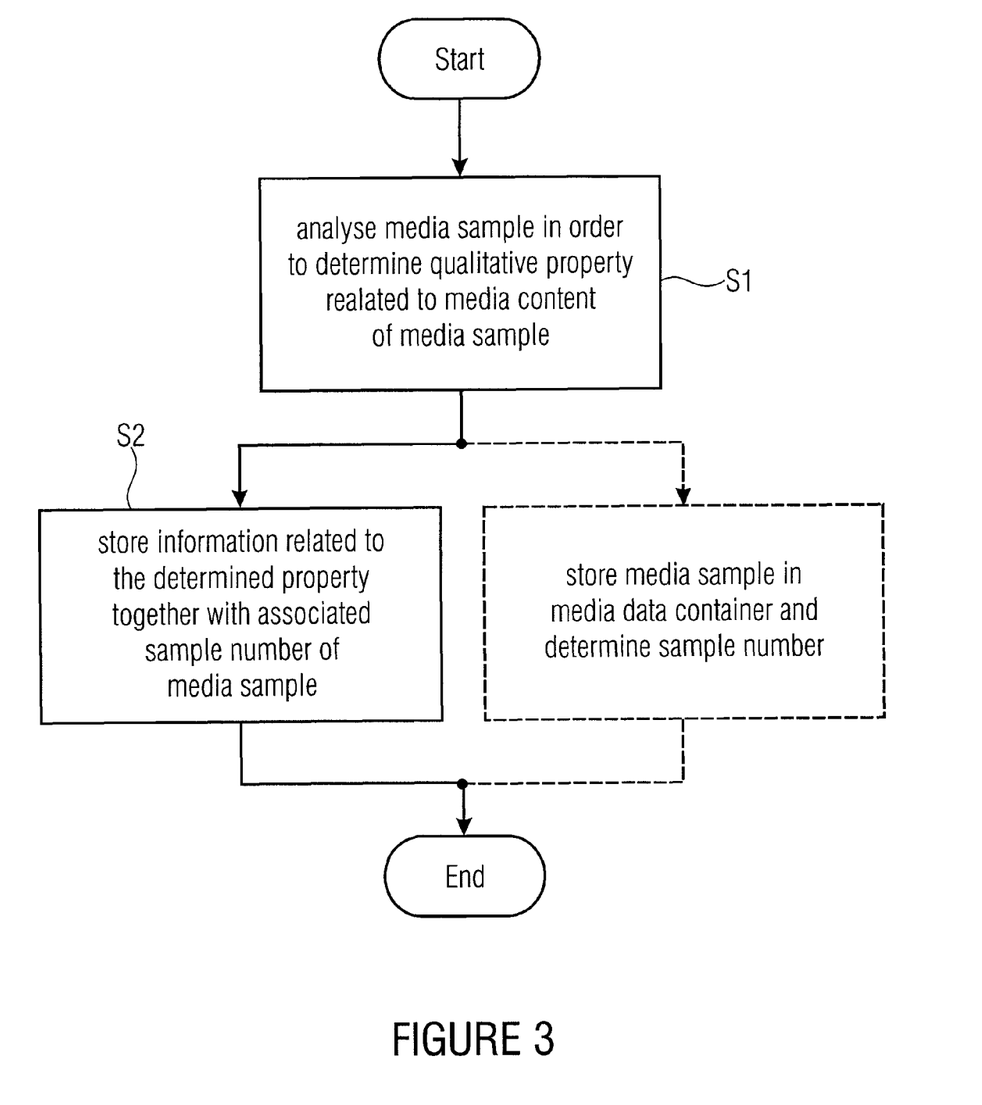
FIG. 3 is a flow chart of a method for outputting said file according to an embodiment of the present invention.

Turning now to FIG. 3, a method for outputting a file 12 based on the ISO base media file format shall be summarized.

In a first step S1 an error information provider 18 analyzes a data sample or a data packet 20 in order to determine an error information 19 related to the analyzed sample 20. In case an error yielding an error information is detected related to said sample, the error information 19 is stored, together with its associated sample number 21 of the erroneous data sample, in the metadata container 14 in step S2. Step S2 comprises storing a SamplePropertyDescriptionBox 52 and a SampleToPropertyBox 54 in the sample table stbl 50 of the metadata container moon 14 of the file 12.

If the data sample 20 is received, e.g. in case of a reception of streamed data samples, each of received data samples is associated thereto a sample number 21. Further, each of received data samples may be stored in chunks of the media data container 16 in an optional step S3.

It can be seen that step S2 and optional step S3 may be essentially performed in parallel, i.e. the error information 19 and the sample number 21 are stored in the media data container 14 while the data sample is stored in the media data container 16 at the same time.

As has been explained before, the samples may be data packets, such as RTP or MPEG-2 transport stream data packets, as it is the case when storing reception hint tracks, as explained in the introductory portion of this specification.

After the samples have been stored in the media data container 16 and the error information has been stored in the metadata container 14 of the file 12 based on the ISO base media file format, the stored error information may be used e.g. during a playback of the samples. For that purpose, embodiments of the present invention provide an apparatus 60 for reading the file 12 with the media data container 16 and with the metadata container 14, as exemplarily shown in FIG. 4.

Figure 4:
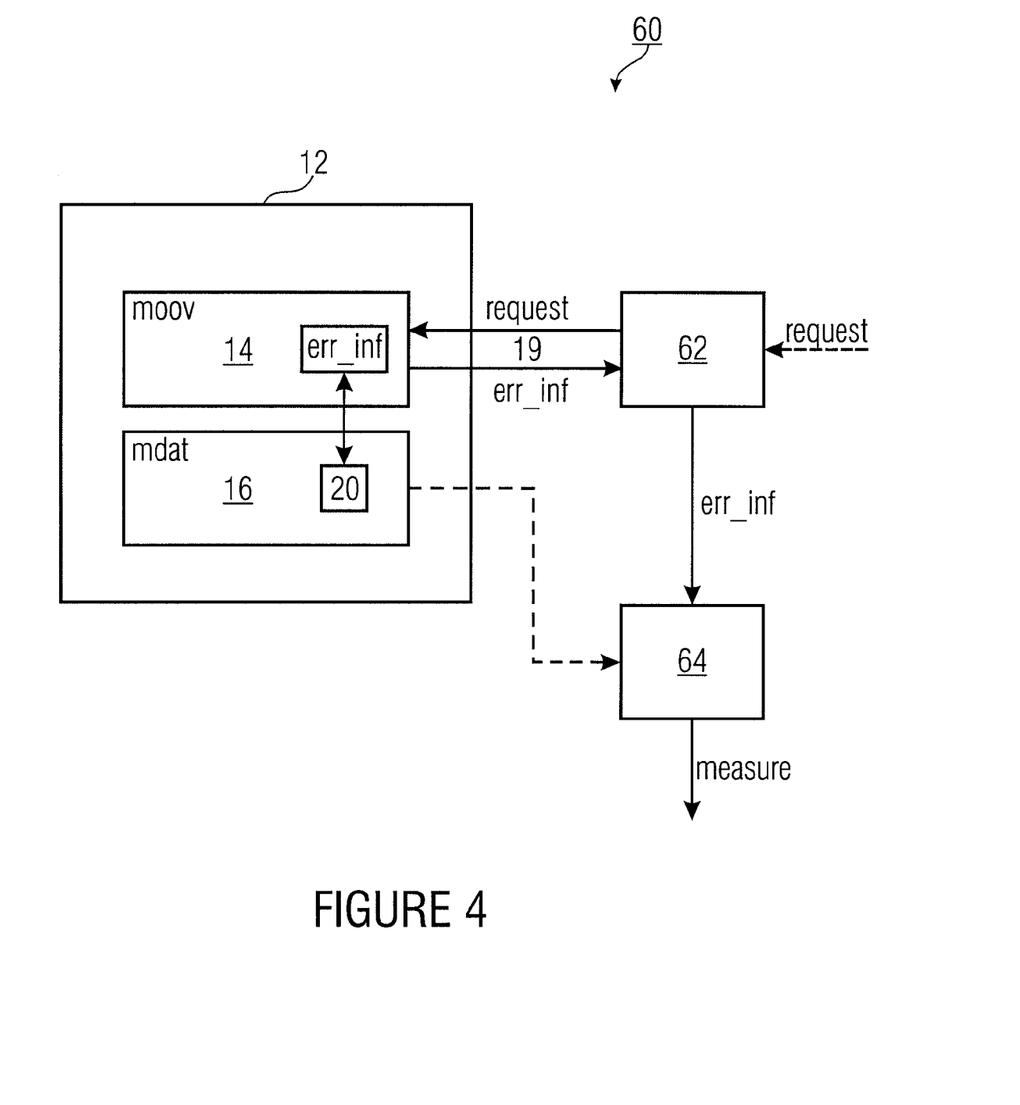
FIG. 4 is a schematic block diagram of an apparatus for reading a file having a media data container and a metadata container according to the embodiment of the present invention.

The apparatus 60 comprises a parser 62 for parsing or analysing the metadata container 14 in order to find error information 19 related to a data sample 20 to be processed. A processor 64 may provide an error-specific measure in case the related error information 19 indicates that the data sample 20 to be processed is erroneous.

To be more specific, the parser 62 may parse the SamplePropertyDescriptionBox 52 and the SampleToPropertyBox 54 in the sample table stbl 50 of the metadata container moon 14 of the file 12. Thereby it may look for sample numbers 21 and their associated qualitative error information 19, e.g. their property_desc_index when referring to the nomenclature used above. Additionally the parser 62 may extract quantitative error information, e.g. how many data packets were lost before or after the packet having the associated sample number.

According to embodiments of the present invention, the processor 64 is adapted to perform an error concealment measure as the error-specific measure in response to the detected error-information. For example, if the data sample to be processed is corrupted or lost, the processor 64 may synthesize the sample by performing some sort of spectral interpolation between spectral values of neighbouring, existing data samples. This may be done, for example, if the data sample relates to an audio or video frame.

In case of a corrupted sample or data packet, the processor 64 may also be adapted to initiate some sort of error correction, for example by employing channel decoding means.

In a further embodiment, the processor 64 may also indicate the error to a downstream device or to a user interface by reporting the qualitative and quantitative error information mentioned before.

Further, the stored error information 19 in the metadata container 14 may be used to unambiguously identify erroneously received data samples after a complete transmission of data samples has been received and stored to the file 12. For that reason the parser 62 may parse the stored error information 19 in the metadata container 14 in order to identify erroneous data samples stored in the media data container 16. The processor may request and receive new copies or versions of the identified erroneous data samples from a content provider's server, e.g. a streaming server, in a non-realtime operation. I.e. no realtime protocol is needed for the retransmission of the identified data samples, which may be single erroneous video frames, for example. The erroneous data samples may then be replaced in the file 12 by the requested and newly received error-free data samples in order to convert the stored file 12 containing errors to an error-free file.

The apparatus 60 may get an external request that creates responses in form of error information for, e.g.
get response consisting of the error information that applies to a particular requested sample,
get response with the closest sample number a particular requested error (e.g. lost samples) applies to.

The described events or sample properties in form of error information are useful for e.g. indexes of reception hint tracks.

Embodiments of the present invention offer the advantage that errors related to samples can be described in an extensible way. Multiple corresponding errors can be grouped to an error-type. The quantitative error information is not limited as it is the case, for example, by the number of SampleGroupDescriptionEntries.

Further, a simple and efficient way is provided to signalize error occurrence locations in a file. This may be useful for error correction, error concealment and/or error indication methods when replaying the data content stored in the media data container of the file.

Depending on the circumstances, the inventive methods may be implemented in hardware or software. The implementation may be done on a digital storage medium, particularly a disc, CD or DVD with electronically readable control signals, which may cooperate with a programmable computer system such that the method is executed. In general, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

While this invention has been described in terms of several embodiments, there are alterations, permutations and equivalents which fall within the scope of this invention. It should also be noted that there are many alternative ways of implementing the methods and compositions of the present invention. It is therefore intended that the following appended claims be interpreted as including all such alterations, permutations and equivalents as falling within the true spirit and scope of the present invention.

The invention claimed is:

1. An apparatus for outputting a file based on the ISO base media file format comprising a media data container and a metadata container, the apparatus comprising:
an error information providing device arranged to analyze a sequence of data samples in order to provide an error information related to a missing or corrupted data sample in the sequence of data samples; and
a recorder device arranged to store the error information together with a sample number related to the missing or corrupted data sample in the metadata container of the file based on the ISO base media file format; wherein
the metadata container comprises a sample table box, the sample table box comprising:
a sample property description box that describes at least one error type and an associated error description index; and
a sample-to-property box that maps only the missing or corrupted data samples to their respective error types using the associated error description index and the sample number related to the missing or corrupted data sample;
the recorder device is arranged to store the provided error information together with the sample number in an error property metadata container allowing an allocation between the data sample and the provided error information, wherein the error property metadata container is comprised by a sample table container allowing an indexing from timing of a data sample to its associated sample number; and
at least one of the error information providing device and the recorder device comprises a hardware implementation.

2. The apparatus according to claim 1, wherein the recorder device is arranged to store, in case of a detected missing data sample in the sequence of data samples, error information indicating the missing data sample together with a sample number of an existing data sample next to the missing data sample.

3. The apparatus according to claim 1, wherein the error information providing device is arranged to detect, whether at least a part of a data sample comprises corrupted information.

4. The apparatus according to claim 1, wherein data samples are stored in the media data container of the file, and wherein the error information providing device is arranged to parse the stored data samples in order to detect a missing or a corrupted data sample.

5. The apparatus according to claim 1, further comprising a receiving device arranged to receive streamed data samples, and wherein the error information providing device is arranged to check the received data samples in order to detect a missing or a corrupted data sample.

6. The apparatus according to claim 5, wherein the recorder device is arranged to store the received data samples in chunks of the media data container of the file and to associate a sample number to each of the stored data samples.

7. The apparatus according to claim 6, wherein the recorder device is arranged to store the provided error information in the sample table container allowing an indexing from timing of a stored data sample to its associated sample number in the chunk.

8. The apparatus according to claim 7, wherein the recorder device is arranged to store a chunk offset table indicating an index of each chunk into the file.

9. The apparatus according to claim 1, wherein the error information providing device is arranged to associate the provided error information to at least one of a plurality of error types, each indicating a different type of error.

10. The apparatus according to claim 9, wherein the recorder device is arranged to store the at least one error type in a related error type description metadata container comprised by the sample table container.

11. The apparatus according to claim 1, wherein the provided error information comprises a qualitative and a quantitative error information, and wherein the recorder device is arranged to store the quantitative error information together with the qualitative error information and the sample number, the quantitative error information quantitatively characterizing the qualitative error information.

12. The apparatus according to claim 1, wherein a data sample is a streamed data packet comprising media data samples.

13. The apparatus according to claim 12, wherein the data packet is a streamed RTP packet, RTCP packet or MPEG-2 transport stream packet.

14. A method for outputting a file based on the ISO base media file format comprising a media data container and a metadata container, the method comprising:
   analyzing a sequence of data samples in order to provide an error information related to a missing or corrupted data sample in the sequence of data samples; and
   storing the error information together with a sample number related to the missing or corrupted data sample in the metadata container of the file based on the ISO base media file format; wherein
   the metadata container comprises a sample table box, the sample table box comprising:
     a sample property description box that describes at least one error type and an associated error description index; and
     a sample-to-property box that maps only the missing or corrupted data samples to their respective error types using the associated error description index and the sample number related to the missing or corrupted data sample; and
   the step of storing includes storing the provided error information together with the sample number in an error property metadata container allowing an allocation between the data sample and the provided error information, wherein the error property metadata container is comprised by a sample table container allowing an indexing from timing of a data sample to its associated sample number.

15. A non-transitory computer readable medium including a computer program for carrying out, when the computer program is run on a computer or micro controller, a method for outputting a file based on the ISO base media file format comprising a media data container and a metadata container, the method comprising:
   analyzing a sequence of data samples in order to provide an error information related to a missing or corrupted data sample in the sequence of data samples; and
   storing the error information together with a sample number related to the missing or corrupted data sample in the metadata container of the file based on the ISO base media file format; wherein
   the metadata container comprises a sample table box, the sample table box comprising:
     a sample property description box that describes at least one error type and an associated error description index; and
     a sample-to-property box that maps only the missing or corrupted data samples to their respective error types using the associated error description index and the sample number related to the missing or corrupted data sample; and
   the step of storing includes storing the provided error information together with the sample number in an error property metadata container allowing an allocation between the data sample and the provided error information, wherein the error property metadata container is comprised by a sample table container allowing an indexing from timing of a data sample to its associated sample number.

16. An apparatus for reading a file based on the ISO base media file format with a media data container comprising stored data samples, and with a metadata container comprising a sample table box, the sample table box comprising:
   a sample property description box that describes at least one error type and an associated error description index; and
   a sample-to-property box that maps only the missing or corrupted data samples to their respective error types using the associated error description index and a sample number related to the missing or corrupted data sample; wherein
   the apparatus comprising:
   a parser device arranged to parse the metadata container in order to find error information related to a data sample to be processed; and
   a processor device arranged to provide an error-specific measure in case the related error information indicates that the data sample to be processed is not available or corrupted;
   the provided error information is stored together with the sample number in an error property metadata container allowing an allocation between the data sample and the provided error information, wherein the error property metadata container is comprised by a sample table container allowing an indexing from timing of a data sample to its associated sample number; and at least one of the parser device and the processor device comprises a hardware implementation.

17. The apparatus according to claim 16, wherein the processor device is arranged to perform an error concealment measure as the error-specific measure.

18. The apparatus according to claim 16, wherein the processor device is arranged to perform an error indication measure as the error-specific measure.

19. The apparatus according to claim 16, wherein the processor device is arranged to request and newly receive an error-free copy of a missing or corrupted data sample, and wherein the processor device is arranged to place the requested and newly received error-free data sample in the file in order to convert the stored file comprising the corrupted data sample into an error-free file.

20. The apparatus according to claim 16, wherein the data samples are streamed data packet comprising media data samples.

21. The apparatus according to claim 20, wherein the stored data samples are RTP packets, RTCP packets or MPEG-2 transport stream packets.

22. A method for reading a file with a media data container based on the ISO base media file format comprising stored data samples, and with a metadata container comprising a sample table box, the sample table box comprising:

a sample property description box that describes at least one error type and an associated error description index; and a sample-to-property box that maps only the missing or corrupted data samples to their respective error types using the associated error description index and a sample number related to the missing or corrupted data sample;

the method comprising:

parsing the metadata container in order to find error information related to a data sample to be processed; and providing an error-specific measure in case the related error information indicates that the data sample to be processed is missing or corrupted; and the provided error information is stored together with the sample number in an error property metadata container allowing an allocation between the data sample and the provided error information, wherein the error property metadata container is comprised by a sample table container allowing an indexing from timing of a data sample to its associated sample number.

23. A non-transitory computer readable medium including a computer program for carrying out, when the computer program is run on a computer or micro controller, a method for reading a file with a media data container based on the ISO base media file format comprising stored data samples, and with a metadata container comprising a sample table, the sample table comprising:

a sample property description box that describes at least one error type and an associated error description index; and a sample-to-property box that maps only the missing or corrupted data samples to their respective error types using the associated error description index and a sample number related to the missing or corrupted data sample;

the method comprising:

parsing the metadata container in order to find error information related to a data sample to be processed; and providing an error-specific measure in case the related error information indicates that the data sample to be processed is missing or corrupted; and the provided error information is stored together with the sample number in an error property metadata container allowing an allocation between the data sample and the provided error information, wherein the error property metadata container is comprised by a sample table container allowing an indexing from timing of a data sample to its associated sample number.

* * * * *